US009979244B2

(12) United States Patent
Droit et al.

(10) Patent No.: US 9,979,244 B2
(45) Date of Patent: May 22, 2018

(54) ROTATING ELECTRONIC MACHINE

(71) Applicant: MOTEURS LEROY-SOMER, Angouleme (FR)

(72) Inventors: Michel Droit, Angouleme (FR); Stéphane Dufau, Angouleme (FR); Sébastien Porcher, Saint Palais (FR); Nicolas Gluard, Xambes (FR)

(73) Assignee: MOTEURS LEROY-SOMER, Angouleme (FR)

( * ) Notice: Subject to any disclaimer, the term of this patent is extended or adjusted under 35 U.S.C. 154(b) by 304 days.

(21) Appl. No.: 14/772,804

(22) PCT Filed: Mar. 6, 2014

(86) PCT No.: PCT/IB2014/059492
§ 371 (c)(1),
(2) Date: Sep. 4, 2015

(87) PCT Pub. No.: WO2014/136078
PCT Pub. Date: Sep. 12, 2014

(65) Prior Publication Data
US 2016/0013690 A1    Jan. 14, 2016

(30) Foreign Application Priority Data
Mar. 7, 2013 (FR) ...................... 13 52065

(51) Int. Cl.
*H02K 21/12* (2006.01)
*H02K 1/28* (2006.01)
(Continued)

(52) U.S. Cl.
CPC ............... *H02K 1/28* (2013.01); *H02K 1/276* (2013.01); *H02K 1/17* (2013.01)

(58) Field of Classification Search
CPC ............. H02K 1/28; H02K 1/276; H02K 1/17
(Continued)

(56) References Cited

U.S. PATENT DOCUMENTS 4,296,544 A * 10/1981 Burgmeier ............. H02K 1/278
29/598
7,911,104 B2 * 3/2011 Ifrim .................... H02K 1/2773
310/156.19
2006/0091752 A1 * 5/2006 Adaniya ............. F04B 27/0895
310/156.16

FOREIGN PATENT DOCUMENTS

JP    11-243653 A    9/1999
JP    11-355985 A    12/1999
(Continued)

OTHER PUBLICATIONS

International Search Report dated May 18, 2015 for PCT/IB2014/059492.
(Continued)

*Primary Examiner* — Thanh Lam
(74) *Attorney, Agent, or Firm* — Pearne & Gordon LLP

(57) ABSTRACT

The present invention concerns a rotating electrical machine, comprising: a magnetic mass (2), in particular a rotor, comprising first housings (3), a plurality of permanent magnets (11) inserted into the first housings (3), and shims (20), preferably deformable, inserted into the first housings (3) and/or into second housings (12) provided in the magnetic mass (2), the shims (20) being configured to wedge the magnets (11) in the first housings by plastic and/or elastic deformation.

13 Claims, 2 Drawing Sheets

(51) Int. Cl.
*H02K 1/27* (2006.01)
*H02K 1/17* (2006.01)

(58) Field of Classification Search
USPC .................................. 310/43, 156.19–156.29
See application file for complete search history.

(56) References Cited

FOREIGN PATENT DOCUMENTS

| | | |
|---|---|---|
| JP | 2000-175388 A | 6/2000 |
| JP | 2000188837 | 7/2000 |
| JP | 2007037202 | 2/2007 |
| JP | 2010098853 | 4/2010 |
| JP | 2011125115 | 6/2011 |

OTHER PUBLICATIONS

Chinese Office Action dated May 3, 2017 for corresponding Chinese Application No. 201480020772.X and English translation.

\* cited by examiner

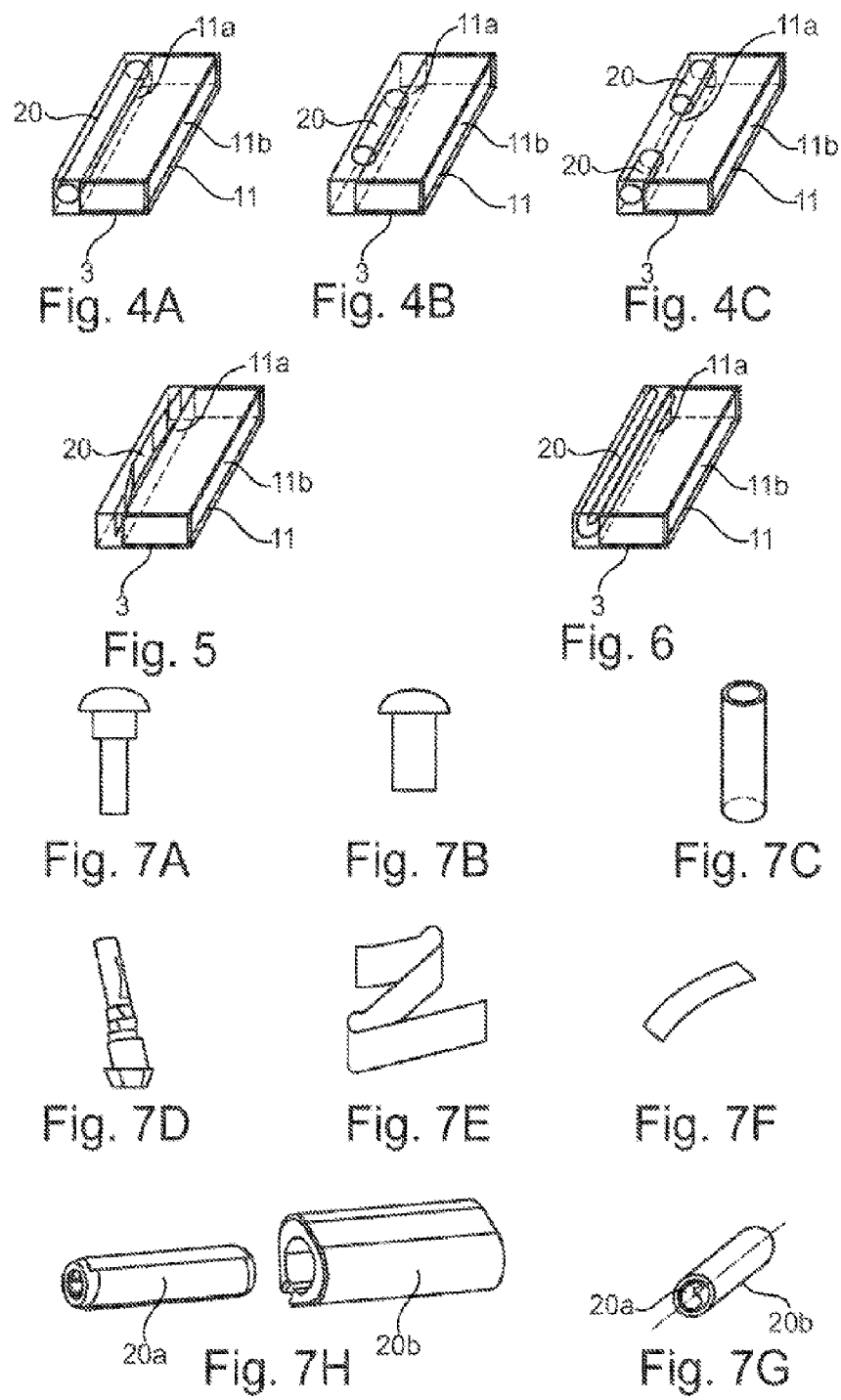

ROTATING ELECTRONIC MACHINE

The present invention relates to the field of rotating electrical machines and notably those comprising a rotor or a stator with flux concentration, and more particularly, but not exclusively, those comprising a rotor made up of a magnetic mass which is itself an assembly of cut thin magnetic plates (preferably with a thickness ranging from 0.65 to 0.25 mm) and of permanent magnets of diverse geometrical shapes.

The permanent magnets may be arranged on the surface, directly facing the air gap or, as a variant, be arranged inside the magnetic mass, in housings thereof, then being called "buried".

In this case, it is necessary to ensure a radial and/or axial mechanical immobilizing of the magnets in their housing, this immobilizing having to be sufficient to avoid damage to the magnets and to allow the machine to operate correctly. In effect, with inadequate wedging, the magnets may be subject to micromovements, which may lead to the destruction of the magnets, to a degradation of the electrical and magnetic performance levels of the machine and to a balance defect.

To secure the magnet in its housing, a number of techniques are these days applied, such as the use of glue, or of a specific form of magnet and of corresponding housing, for example the use of magnets having a trapezoidal cross section, or even the impregnation of the magnet in its housing after it has been fitted.

However, these techniques present certain drawbacks. They can be difficult and costly to implement. For example, a process of gluing the magnets in their housings may be restrictive with respect to working conditions, may pose a problem of durability over time of the assembly for certain applications, and renders the recovery of the magnets practically impossible without damage.

With regard to the impregnation, it is a lengthy process, very costly and cumbersome in terms of implementation, given the need to use lacquer tanks and ovens. Furthermore, this imposes a thermal constraint associated with the demagnetization of the magnets and also renders the recovery of the magnets impossible without damage.

Finally, the use of magnets with a specific form is not always possible in as much as such forms can complicate the production of the magnetic plate and increase the cost of the cutting tools and thus the total machine manufacturing cost.

In the patent application U.S. 2006/0091752, shims are used that are intended to deform in operation, at high speed, under the effect of the centrifugal force.

In JP 2011-125115, the rotor includes elastic support tongues which are configured to circumferentially form spaces on either side of the permanent magnets.

The application JP 2010-098853 relates to a dual-stator motor in which the rotor comprises permanent magnets inserted into housings, between portions of the magnetic mass tightened together.

The application JP 2007-037202 relates to a rotor that has end plates comprising projections that can be plastically deformed to hold the permanent magnet in position.

Furthermore, in order to improve the cost and the performance of the electrical machines, it may be necessary to increase the quantity of the magnets, notably when it is not possible to improve their quality, or to retain the same performance levels with magnets of lesser quality and that are less expensive.

An optimal electromagnetic performance level is obtained when a buried magnet is in perfect contact on each of its two polar faces with the magnetic mass into which it is inserted, the passage of the magnetic flux from the magnets to the magnetic mass being maximized. A "polar face" of a magnet should be understood to mean a face of the magnet which is magnetized with an identical polarity, thus forming the North or South pole of the magnet.

However, there is generally a space between the magnets and their housings in the magnetic mass into which they are inserted, thus constituting an air gap from the magnetic point of view which necessarily induces losses in the electromagnetic performance levels of the machine. Such a space is linked to the manufacturing constraints which do not make it possible, for reasonable costs, to observe very precise dimensions in the cutting of the magnetic mass or in the design of the magnets. A space may also be due to the fact that, since the magnets are sensitive to corrosion, it may be necessary to cover them with a protective coating also inducing an uncertainty as to their dimensions.

Furthermore, the mounting constraints make it necessary to retain a certain space between the magnets and the housings of the magnetic mass, so as to facilitate the insertion of the magnets therein, notably when the magnetic mass is formed from a stack of thin magnetic plates. In effect, in this case, the walls of the magnetic mass may not be perfectly rectilinear given the fact that they are made up of a stack of thin plates, which may necessitate an even greater mounting space. Conventionally, it is possible to have a tolerance interval of 0.2 mm in the dimensions of the magnets, such that it may be necessary to provide a minimum space of 0.15 mm on either side of the magnets for the mounting, in addition to the tolerance due to the design of the magnetic mass. In the final analysis, conventionally, it is possible to obtain a space of the order of 0.25 to 0.35 mm per magnet, which is far from negligible relative to the usual air gaps between rotor and stator, commonly encountered on low- to medium-power electrical machines, which are of the order of 0.5 mm to 1 mm.

In the case where the machine comprises a number of magnets arranged in a number of rows per pole in the magnetic mass, the spaces of the magnets of the different rows are added together and commensurately weaken the magnetic performance levels of the machine.

There is therefore a need to improve the magnetic performance levels and reduce the manufacturing and mounting costs of rotating electrical machines.

Thus, the subject of the invention, according to one of its aspects, is a rotating electrical machine, comprising:
- a magnetic mass, notably rotoric, comprising first housings,
- a plurality of permanent magnets inserted into the first housings, and
- shims, preferably deformable, inserted into the first housings and/or into second housings formed in the magnetic mass, the shims being configured to cause, by plastic and/or elastic deformation, the magnets to be wedged in the first housings.

"First housing" should be understood to mean a housing into which is inserted at least one permanent magnet. As will be seen later, a first housing may not have any shims or include, for example, one or two thereof.

"Second housing" should be understood to mean a housing without a permanent magnet. As will be seen later, a second housing may be without any shims or include, for example, one or two thereof.

The presence of the shims in the housings of the magnetic mass, whether in the first or the second housings, makes it possible to immobilize the permanent magnets in their first housings, whether by deformation of the shims in the first housings, by the deformation of the shims in the second housings, which leads to a deformation of the first housings which receive the magnets, and/or by a deformation of the material of the magnetic mass, by a wedge effect upon the insertion of the shims.

The magnetic mass is preferably produced in a relatively deformable material, commonly soft iron, which can be easily adapted by plastic deformation to closely follow the form of the magnet and/or of the shims received in the corresponding housing. This deformation may take place in the plane of each magnetic plate, when the magnetic mass comprises a bundle of magnetic plates.

The use of a shim makes it possible to guarantee, easily, safely and inexpensively, that the magnet is satisfactorily held in its housing after insertion of the shim and possible expansion of the shim, for example in this housing, between the magnet and a wall of said housing.

The machine according to the invention makes it possible to dispense with the mounting spaces and tolerate a significant space in the manufacturing of the magnets and of the magnetic mass. It also makes it possible to avoid friction problems in the insertion of the magnets into their housings and also eliminate an operation of impregnation of the rotor or of gluing of the magnets.

The insertion of the shims into the machine can be very rapid, which allows for productivity savings. Furthermore, the tools for fitting these shims is simple and inexpensive. Thus, the use of the shims proves inexpensive and very easy to implement. Furthermore, since the various families of shims are already industrially produced elsewhere, this makes it possible to reduce the risks of development quality and the laboratory tests.

Finally, such a use also makes it possible to subsequently dismantle the magnets, which is not possible if glue or impregnation are used. The possibility of dismantling by removal of the shims allows for a noteworthy economic saving in as much as the magnets which are costly components can be recovered, if necessary. This may also facilitate the recycling of the machine.

Preferably, the shims are deformable.

"Deformable" should be understood to mean that the shim is configured to be able to undergo a change of shape after its insertion into the housing. The deformation can be obtained by a variation of one of the dimensions, for example its diameter, its length, its width, or its height, and/or a change of its form, for example a flattening or an elongation, or even a change of curvature. A dimension of the shim may undergo a variation of at least 10%, even 20%, to provoke the desired immobilization of the magnet.

The shims may be in the form of a rivet, for example a staged rivet or unstaged rivet, a snap-head rivet or hammer rivet, or an insertion rivet, in the form of a pin, being for example an elastic pin, in the form of a plug, being for example an expansive plug, or even in the form of a flat spring or hair pin. The shims may even be made up of a rotary notched rigid core and a jacket that expands under the effect of the rotation of the core, arranged to avoid the return of the core in the reverse direction at the end of its rotation causing the expansion of the jacket. The shims are preferably rivets.

The head of the rivet or of the plug can be round, countersunk, cylindrical, flat, or domed. In a variant, the shim has no head.

The shim may be solid or hollow. It may be staged or unstaged. It may use a snap-head system, force fitting, screwing, or jamming. The deformation of the shim in its housing may or may not be irreversible. An example of irreversible deformation corresponds to the use of a snap-head rivet and an example of reversible deformation is the use of an elastic pin, which tends, by wanting to revert through elasticity to its initial form, to exert the pressure causing the immobilization of the magnet.

The first housings may include an abutment making it possible to retain the magnet in its housing on one side, while a deformable shim is inserted on the other side of the housing, the magnet being held against the abutment by the pressure exerted by the deformable shim.

The shims are preferably made of amagnetic material(s), such as, for example, amagnetic steel, so as not to interfere with the circuit of the magnetic flux in the magnetic mass. The deformable shim may be produced in an amagnetic material chosen from the following list: aluminum, stainless steel, or plastic, this list not being exhaustive.

At least one deformable shim may be inserted between a wall of a first housing and a polar face of the corresponding magnet or between a wall of the first housing and a non-polar face of the magnet. One or more shims may be inserted along one or two faces of the magnet at right angles to the polar faces thereof, or, as a variant, along one or both of the polar faces of the magnet.

As a variant, or in addition, deformable shims may be inserted into second housings without any permanent magnets. In this case, the walls of a first housing that houses at least one magnet may undergo a deformation upon the insertion of the shim. Shims may be inserted into second housings arranged between two consecutive housings in a row of first housings, permanent magnets being inserted into at least one of these housings, even into both. As a variant, shims may be inserted into second housings arranged between two housings of two different first rows of housings.

The shims are inserted into the magnetic mass preferably parallel to the axis of rotation of the machine.

The electrical machine may not have any second housings and comprise only first housings into which are inserted permanent magnets. Shims may be inserted into some or into all of said first housings. In total, the magnetic mass may comprise permanent magnets inserted into all or some of the first housings, for example into at least half of the housings, even into more than two thirds of the housings, even better into all of the housings.

The magnets are arranged in the first housings in such a way as to define poles of the rotor. The housings may be arranged in the form of an arc of a circle or in a V form, by being, for example, arranged symmetrically relative to a radial axis of the corresponding pole. "Radial axis of the pole" should be understood to mean an axis of the pole oriented radially, that is to say along a radius of the magnetic mass. It may be an axis of symmetry for the pole. This radial axis may intersect the apex of the pole.

The housings may be arranged in rows of housings so as to define the poles of the magnetic mass. Each pole may comprise at least three housings per pole. The housings may be arranged in one or more rows per pole. Each pole may comprise at least two rows, even at least three rows.

The magnetic mass may comprise material bridges formed between two consecutive housings in a row of housings, in order to improve the cohesion of the machine against centrifugal forces. The material bridges may be oriented radially.

Material bridges may be formed between two first housings into which permanent magnets are inserted, and/or between a first housing and a second housing without any permanent magnet, and/or between a housing, housing a permanent magnet or not, and the air gap of the machine formed between the stator and the rotor.

At least one material bridge may be of generally curved form. A material bridge of curved form may notably be formed between a first housing into which is inserted a permanent magnet and a second housing without any permanent magnet, even possibly without any shim. The curved form of the material bridges may make it possible to benefit, upon deformation induced by one or more shims, from a sufficient reduction of the space between the plates and the magnets, without excessive deformation of the bridges.

Preferably, all the shims of a same series of consecutive housings are inserted simultaneously, so as to favor easy insertion.

In an exemplary embodiment, the housings of a same row are arranged on a central branch and two lateral branches situated on either side of the central branch, giving, for example, a U configuration, the central branch being, for example, the only one to include one or more permanent magnets, the lateral branches not housing any permanent magnet.

For a same pole, the housings of this pole may be arranged in a single row. The concavity of the row may be oriented toward the apex of the pole, that is to say toward the air gap.

Preferably, for a same pole, the housings of this pole are arranged in a number of rows, each of a concavity which may be oriented toward the apex of the pole, notably in substantially concentric rows. "Concentric" should be understood to mean that median axes of the housings of the rows, taken in a plane at right angles to the axis of rotation of the rotor, intersect at a same point. This arrangement in a number of concentric rows makes it possible to improve the concentration of the flux without necessarily having to increase the size of the housings or the quantity of permanent magnets necessary to obtain an equivalent flux. The number of rows per pole may notably be two, three or four.

When the rotor comprises, for a same pole, a number of rows, the latter can be of decreasing length when moving toward the air gap, the longest being closest to the axis of rotation and the shortest being on the side of the air gap. The length of a row corresponds to the aggregate length of the housings of that row.

The first housings may have, in cross section, that is to say at right angles to the axis of rotation, a generally rectangular or trapezoidal form, this list being nonlimiting.

The permanent magnets can be of generally rectangular form. Given the form of the housings, the placing of the magnets in the housings may leave a free space in the housing between the magnets and the small sides of the corresponding housing. The free space is, for example, of generally triangular form.

The magnetic mass is formed from a stack of magnetic plates, preferably of single-piece plates, or segments of individual plate(s) wound on itself/themselves about the axis of rotation. The magnetic mass need not have any individual pole pieces. In this case, the magnetic plates of the magnetic mass can be deformed by the action of the shims in their plane, that is to say in a plane at right angles to the axis of rotation of the machine, or, to put it yet another way, in a plane other than a plane parallel to the axis of the machine. The shims need not participate in the cohesion of the magnetic mass. In other words, the shims need not be used to join together the segments of the magnetic mass.

When the magnetic mass comprises a bundle of assembled single-piece plates, the bundle is kept compressed, for example, using tie-rods which pass through the bundle of plates in the axial direction. The shims need not keep the plates of the bundle compressed.

All the plates of the magnetic mass are preferably identical to one another.

The magnetic mass may be a rotoric mass. The rotor may comprise a number of poles of between two and twelve, even better between four and eight.

The permanent magnets may be made of ferrites or with rare earths or with any other type of magnetic material. The arrangement of the housings makes it possible to concentrate the flux from the magnets and obtain, notably with ferrite magnets, advantageous performance levels.

The machine may have reluctance. It may form a synchronous motor.

The machine may operate at a nominal peripheral speed (tangential speed taken at the outer diameter of the rotor) which may be greater than or equal to 100 meters per second, the machine according to the invention allowing for operation at high speeds if such is desired.

The machine may have a relatively large size. The diameter of the rotor may be greater than 50 mm, even greater than 80 mm, being for example between 80 and 300 mm.

The invention will be able to be better understood on reading the following detailed description of nonlimiting exemplary embodiments thereof, and on studying the attached drawing, in which:

FIGS. 3A to 3D, 4A to 4C, 5 and 6 are schematic and partial views of variant embodiments of a rotor according to the invention, and FIGS. 7A to 7H illustrate exemplary embodiments of shims.

Figure 1:
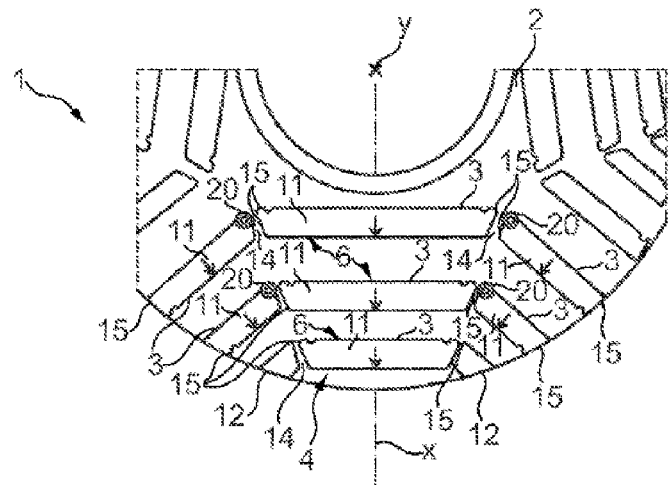
FIG. 1 is a schematic and partial view of a rotor according to the invention.

In the drawing, the relative proportions of the different elements represented have not always been observed, in the interests of clarity.

FIGS. 1 and 2 illustrate a rotor 1 of a rotating electrical machine, comprising a rotoric magnetic mass 2 in which are formed first housings 3 so as to define the poles 4 of the rotor, each pole having a radial axis X. Permanent magnets 11 are inserted into each of the first housings, their direction of magnetization being illustrated by arrows. Each permanent magnet 11 has two polar faces 11a, 11b, one magnetized North (N) and the other South (S).

In this example, the rotor comprises seven first housings 3 per pole, which are arranged in three concentric rows 6 around each of the poles, the concavity of the rows being oriented toward the air gap. Two rows 6 comprise three first housings 3 arranged consecutively in the row, and one row 6, the closest to the air gap, comprises a single first housing 3. The three rows 6 of a same pole are of decreasing length when moving toward the air gap, the longest being situated on the side of the axis of rotation X of the machine and the shortest being located on the side of the air gap.

The permanent magnets 11 are, in this example, of generally rectangular form in cross section. The first housings 3 are of elongate form. They each comprise two small sides 9 and large sides 10. The placing of the magnets 11 in the first housings 3 may leave a space between the polar faces 11a, 11b of the magnets 11 and the walls of the corresponding first housing, defined by the large sides 10, and two free regions 15 in each housing between the magnet and the small sides 9 of the corresponding housing. The free region 15 can be of generally triangular form, as illustrated, or of another form. The small sides 9 of a housing may be rectilinear or curved.

The electrical machine comprises deformable shims 20 inserted into the magnetic mass, the shims 20 making it possible to cause, upon their insertion, a magnet 11 to be wedged in the first housing 3 in which it is present, and to improve the contact between at least one polar face 11a, 11b of a magnet 11 and a corresponding wall of the first housing 3 defined by one of its large sides 10.

The first housings 3 comprise, in the example described, an abutment 25 making it possible to retain the magnet 11 in its housing on one side, while a deformable shim 20 is inserted into the other side of the housing, the magnet being held against the abutment 25 by the pressure exerted by the deformable shim 20.

The regions between two consecutive housings of a row 6 define material bridges 14. The material bridges 14 between two consecutive housings of a row 6 may have a width, measured at right angles to their longitudinal axis, less than 8 mm and greater than 0.5 mm.

Figure 2A:
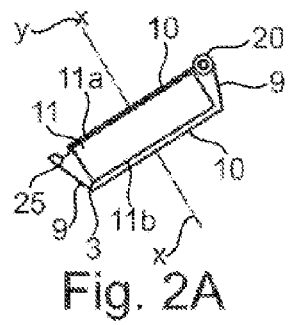
FIG. 2A represents a detailed embodiment of the rotor of FIG. 1.
Figure 2B:
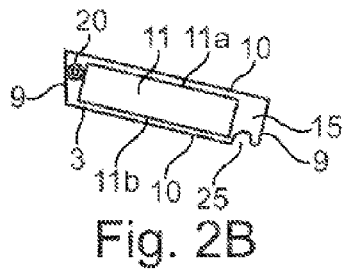
FIG. 2B is a view similar to FIG. 2A of a variant embodiment.

In the example illustrated, four first housings 3 of a pole house a shim 20. The shims 20 are inserted, in the example considered, along a corner of the magnet 11, as illustrated in FIG. 2A, or along a small side of the magnet 11, as illustrated in FIG. 2B.

In this example, all the deformable shims 20 are inserted into first housings 3 in which permanent magnets 11 are inserted.

Figure 3D:
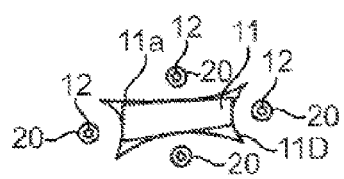
Figure 3A:
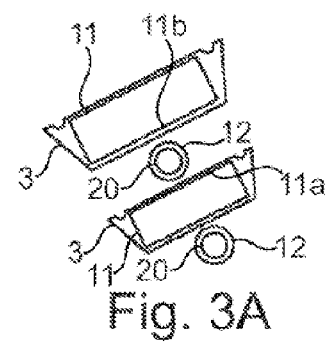
Figure 3B:
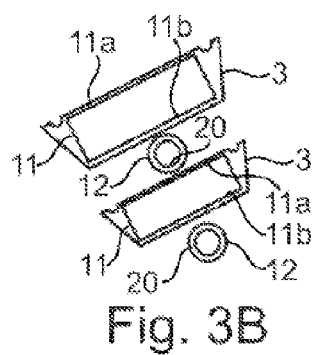
Figure 3C:
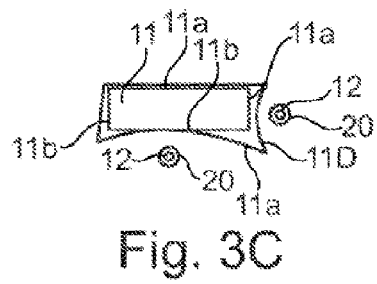

As a variant, the electrical machine may comprise second housings 12 without any permanent magnets into which deformable shims are inserted. As an example, FIG. 3A shows second housings 12 without any permanent magnets, which are arranged between two first housings 3 of two different rows 6 of housings. In this case, the deformation of the deformable shims 20 arranged in the second housings 12 leads to a deformation of the first housings 3 which receive the magnets 11, as can be seen in FIG. 3B. The wall of the first housings 3 comes to be pressed against the corresponding polar face 11a or 11b of the neighboring magnet 11. It is also possible to produce a deformation of 2 or 4 faces of the housing 3, as illustrated in FIGS. 3C and 3D. In this case, the deformable shim 20 used may be an expandable plug or, as a variant, a rivet, a pin or a spring.

The machine may, as a variant or in addition, comprise second housings 12 arranged in a row 6 of housings between two first housings 3, or at the end of a row, that is to say in proximity to the air gap. These housings 12 are in this case empty, that is to say without either magnets or shims, as illustrated in FIG. 1 for the row 6 closest to the air gap.

The shims 20 may have a cylindrical form, as illustrated in FIGS. 4A to 4C. In this figure, a shim 20 is represented inserted between a wall of a first housing 3 and the polar face 11a of the corresponding magnet 11. The length of the shim 20 may correspond to the length of the magnet 11, as represented in FIG. 4A, or be less than that. It is for example possible to introduce, into the housing 3, a single shim 20, arranged in a central position relative to the magnet 11, as illustrated in FIG. 4B, or, as a variant, two consecutive shims 20, each arranged in proximity to one of the ends of the magnet 11, as represented in FIG. 4C. The shims of cylindrical form 20 may also be formed by the assembly of two components as illustrated in FIG. 7G, one rigid 20a exhibiting an excentricity, the other, deformable 20b, compressing and holding the magnet 11 situated in proximity. The arrangement of these shims is for example identical to that of FIGS. 4A, 4B and 4C.

Shims of this type with rigid core and deformable jacket are marketed by the company Alcoa Fastening Systems under the name self-locking expander, one of the references of which is reproduced in exploded form in FIG. 7H.

Turning the central core 20a causes an expansion of the jacket of the outer jacket 20b. Notches are provided on the cooperating surfaces to immobilize the core at the end of its rotation.

The shims 20 may be formed by a spring, for example having a blade form, as illustrated in FIG. 5 or in the form of a hair pin as illustrated in FIG. 6.

The deformable shim 20 may be in the form of a rivet, for example a staged rivet, as illustrated in FIG. 7A, or an unstaged rivet, as illustrated in FIG. 7B, a snap-head rivet, or an insertion rivet, in the form of a pin, such as, for example, an elastic pin, as illustrated in FIG. 7C, in the form of a plug, such as, for example, an expansive plug, as illustrated in FIG. 7D, or even a form of spring, such as, for example, a blade spring folded into a Z, as illustrated in FIG. 7E, or a flat spring as illustrated in FIG. 7F.

The head of the rivet or of the plug may be round, countersunk, cylindrical, flat, or domed. The deformable shim may even have no head, as illustrated in FIGS. 7C, 7E and 7F.

The invention is not limited to the examples illustrated. It is notably possible to modify the polarity of the rotor without departing from the scope of the present invention.

The rotor may cooperate with any type of stator, with distributed or concentrated winding.

The magnetic mass 2 may have other arrangements of the housings intended to receive the magnets, within the magnetic mass.

The housings 3 and 12 may each extend along a longitudinal axis which may be rectilinear, as illustrated previously, or curved.

A same housing may receive a number of shims.

The invention claimed is:

1. A rotating electrical machine, comprising:
   a magnetic mass, comprising first housings,
   a plurality of permanent magnets inserted into the first housings, and
   deformable shims, inserted into the first housings and/or into second housings formed in the magnetic mass,
   the shims being configured to cause, by plastic and/or elastic deformation, the magnets to be wedged in the first housings.

2. A rotating electrical machine, comprising:
   a magnetic mass, comprising first housings,
   a plurality of permanent magnets inserted into the first housings, and
   shims, inserted into the first housings and/or into second housings formed in the magnetic mass,
   the shims being configured to cause, by plastic and/or elastic deformation, the magnets to be wedged in the first housings, the shims being in the form of a rivet, in the form of a pin, in the form of a plug, or in the form of a flat spring or hair pin or made up of a rotary notched rigid core and a jacket that expands under the effect of the rotation of the core, arranged to avoid the return of the core in the reverse direction at the end of its rotation causing the expansion of the jacket.

3. The electrical machine as claimed in claim 1, in which the shims are inserted into the first housings.

4. The electrical machine as claimed in claim 3, in which at least one shim is inserted between a wall of a first housing and a non-polar face of the magnet.

5. The electrical machine as claimed in claim 1, in which shims are inserted into second housings, without any permanent magnets.

6. The electrical machine as claimed in claim 5, in which shims are inserted into second housings arranged between two first housings of two different rows of housings.

7. The electrical machine as claimed in claim 5, in which shims are inserted into second housings arranged between two first consecutive housings in a row of housings, permanent magnets being inserted into at least one of these first housings.

8. The electrical machine as claimed in claim 1, being without any second housing and comprising only the first housings in which the permanent magnets are inserted.

9. The electrical machine as claimed in claim 1, in which the first housings include an abutment making it possible to retain each magnet in its housing on one side, while a deformable shim is inserted from the other side of the housing, the magnet being held against the abutment by the pressure exerted by the shim.

10. The electrical machine as claimed in claim 1, the housings being arranged in rows of housings so as to define the poles of the magnetic mass.

11. The electrical machine as claimed in claim 1, the magnetic mass comprising material bridges formed between two consecutive housings in a row of housings.

12. The electrical machine as claimed in claim 1, in which the magnetic mass is formed from a stack of magnetic plates.

13. The electrical machine as claimed in claim 1, the magnetic mass being a rotoric mass.

* * * * *